Nov. 30, 1954 R. C. DAVIS ET AL 2,695,794
FLOATING CONDUIT
Filed July 19, 1948 3 Sheets-Sheet 1
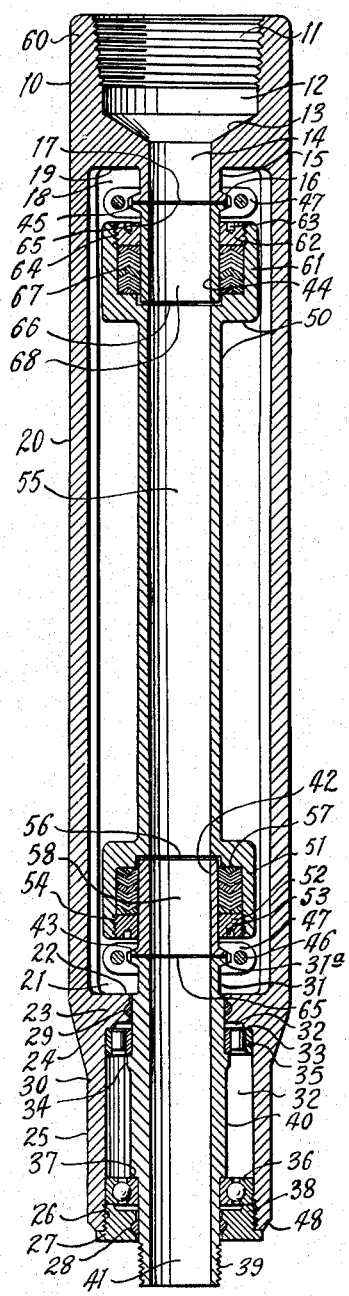
Fig. I
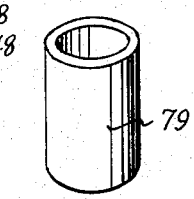
Fig. VIII
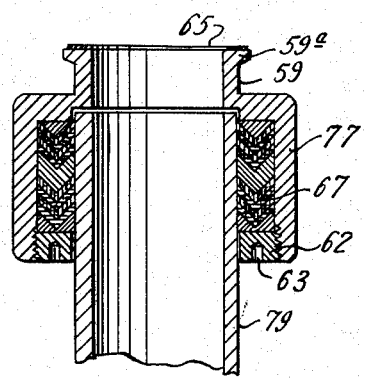
Fig. II
Fig. III
INVENTOR.
ROY C. DAVIS
R. G. TAYLOR, JR.
BY
ATTORNEY

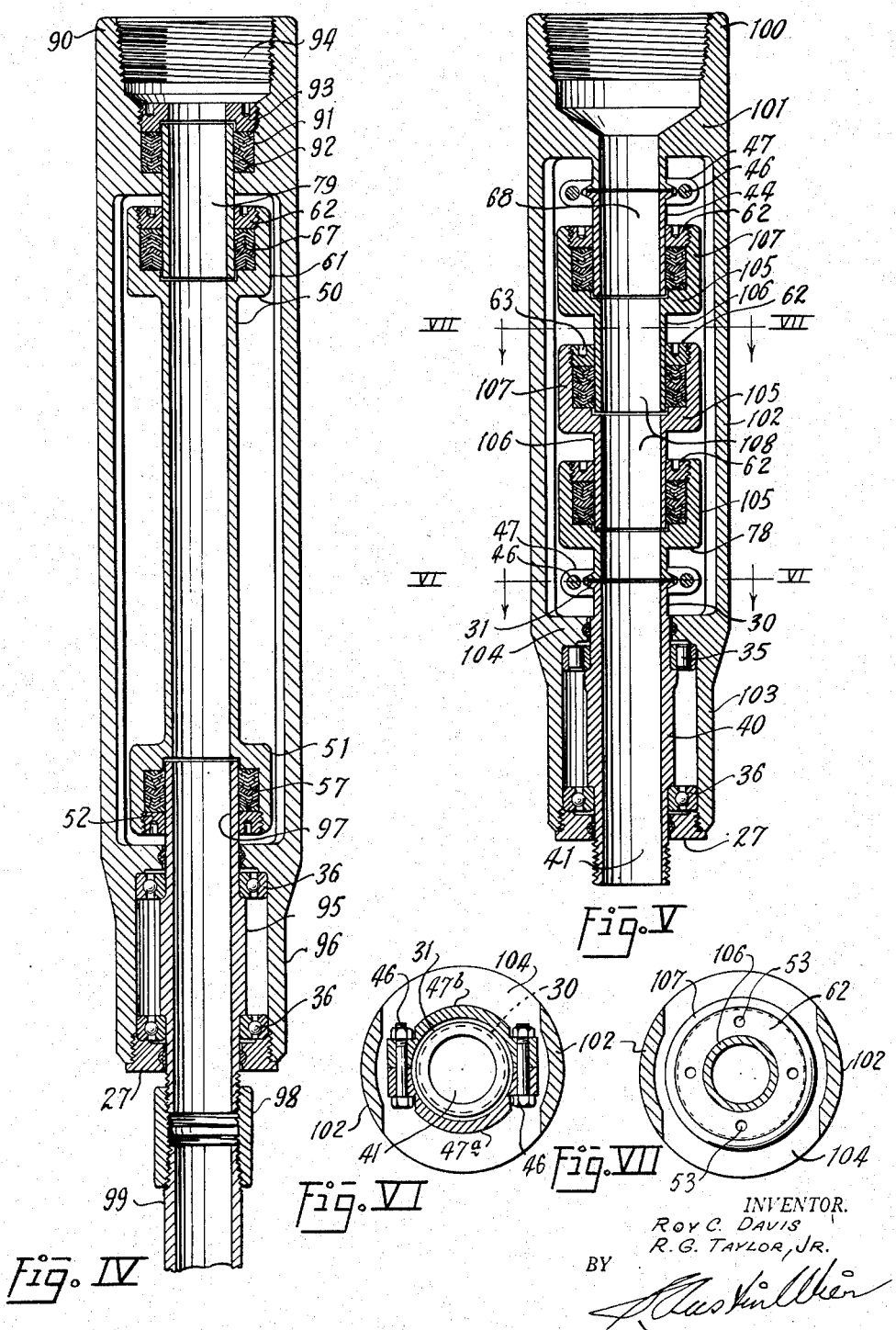

Nov. 30, 1954  R. C. DAVIS ET AL  2,695,794
FLOATING CONDUIT
Filed July 19, 1948  3 Sheets-Sheet 3
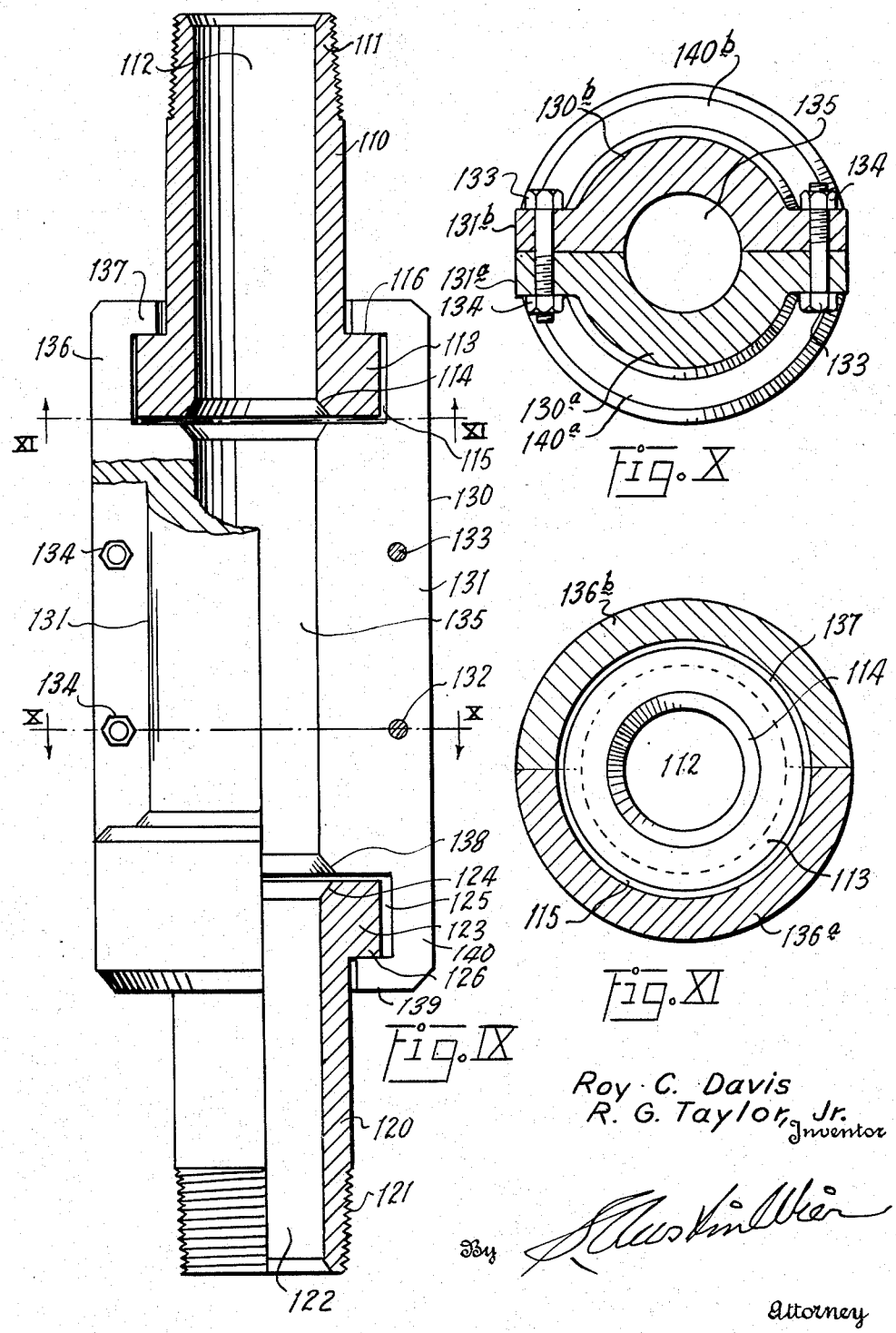
Roy C. Davis
R. G. Taylor, Jr.
Inventor
By [signature]
Attorney

United States Patent Office 2,695,794
Patented Nov. 30, 1954

2,695,794

FLOATING CONDUIT

Roy C. Davis and Raymond G. Taylor, Jr., Dallas, Tex., assignors to The Guiberson Corporation, Dallas, Tex., a corporation of Delaware Application July 19, 1948, Serial No. 39,386

5 Claims. (Cl. 285—97.1)

This application has to do with a floating conduit arranged between rotating and non-rotating members. Such a conduit is rotatable, and it may be provided with multiple sealing elements in which the relative speed of rotation is variable. This invention may be described as a rotating swivel coupling, arranged for the passage of fluid therethrough, to and/or from both rotating and fixed conductors. Sealing means may be provided against the escape of fluid under pressure; and such means may be so arranged as to allow variations in the relative speeds existing between such means and the parts sealed thereby.

In this invention is a conduit member rotatively responsive to variations in the coefficient of friction engendered between it and other members frictionally engaging it. It may be described as a rotatable transfer tube, moved to varying speeds by friction and arranged to communicate with both a primary rotating member and a primary stationary member, constituting a rotatable link disposed between the two and affording a conduit common to both.

This invention is distinguished from prior art devices and old-style contrivances in many particulars and respects. Most notable advances of this invention, over unsatisfactory coupling devices of the past, arise from these facts:

(1) We provide a plurality of frictional faces to operate our floating transfer tube. Such contact surfaces may have seals to prevent leaks, if desired, and such seals may be provided as metal-to-metal members in friction, or stuffing boxes and packing may be used.

(2) Wear is automatically distributed throughout the surfaces in frictional contact.

(3) All seals, save only one, may so fail as to prevent rotation therein without hindering operations or causing shut-down time or requiring replacement.

(4) One such seal or bearing surface operates near or at each end of the transfer tube (or of each of the segments of such tube).

(5) Either of any two such stuffing boxes or seals, or any one or two out of any three such seals, or all such seals, save only one, in a plurality thereof, may become "frozen" and/or stuck, for any reason whatsoever, without having the slightest effect upon the rotation of the primary rotating member of any assembly in which my device is the connecting link between such member and a stationary member.

This invention may be employed wherever a tube or conduit is required to rotate while fluid is passing therethrough and flowing from or to both a fixed or a non-rotating tube, conduit or vessel.

The uses of this invention are many. In the various fields of industry it may be referred to under various names. For instance, it is sometimes called a transfer tube. At other times, it may be called a working tube, or a wear tube, or a wash pipe, or a rotating coupling, or a self-aligning conduit, or a floating conduit. Some call it a rotating seal. This invention might well be called a "free wheeling" swivel coupling.

This device always allows relative rotative motion between the two elements coupled by it, and it is hollow stemmed, thus allowing the passage therethrough of liquid or gas or any other fluid. It is a multiple sealed rotating element, so packed off or sealed as to prevent leakage of the fluid, so that none may be lost, even though it is under considerable pressure, whenever such construction is required; but the extent of sealing is optional; and packing or other means for containing high fluid pressures may be dispensed with.

Many industries now make new demands for high speeds in shafts and tubes which are required to be successfully packed off under pressure. Prior to the advent of this invention the answers to such demands have been very disheartening and discouraging. Many manufacturers, confronted with demands for high speed shafts will not guarantee any satisfactory life to the packing at all.

Another difficult factor, always present, is in the ratio of speed to shaft size. The problem of keeping down temperature and drag is at once apparent. An effective block or pack off must be maintained against the pressure of the fluid, and at the same time allow the shaft to rotate as freely as possible. Shafts of large diameter and high speed present a multiplied problem, as against smaller shafts of low speed. Increasing the size of the shaft vastly increases friction and heat because of the increase in the surface feet per minute passing the packing. Doubling the diameter of the shaft doubles such friction surface feet per minute.

In the past, high speed shafts and tubes have caused and amplified the problem of extended shut-down time and increased maintenance expenses tremendously, because the costs of labor and materials involved in renewal and replacement of packing and parts have multiplied with the new and greater speeds demanded.

A further problem has come about because of trouble in the alignment and the centering of the wear tube, or conduit, or wash pipe, in the packing actively engaging the tube where the rotation and the sealing must take place. Gripping and holding the rotatable tubular member may assist in keeping alignment within the packing, but it creates an increased problem of friction. All of these gripping devices hold against rotation, acting as a brake.

These problems, and their kindred, are common to many industries in which our invention is now rapidly finding favor, because it offers a satisfactory answer to these problems.

This invention may be used to great advantage in many industrial operations, typical of which are the few cited immediately below, thus:

(1) As a hydraulic swivel, used in oil, gas or water well drilling, and in seismographic and geologic explorations, affording a long-lived "wash pipe."

(2) In drilling heads and rotating casing heads, in well drilling operations of all kinds.

(3) In a "take off" for hydraulically activated machine tools of many kinds.

(4) In a "take off" for "coolant" for steel mill rolls, rubber mill rolls, calendar rolls, and the like.

(5) With an internal screw and vanes for the continuous mixing of various compounds, ingredients and supplies, as in the mixing of chemicals, and in the mixing of cement, and in the mixing of plastics, and their components.

(6) In a "take off" for hydraulic or pneumatic power transmission devices, such as clutches, speed reducers, and the like.

(7) Rotatably adjustable and/or aligning joints, couplings, unions, conduits and such.

(8) In rotating power chucks for lathes, drills and machine tools generally.

(9) In making connections for rotating hose, pipe, tube, conduits and other vessels.

Wherever employed, this invention reduces friction. It reduces heat and wear; and it lengthens the life of the parts in contact. It distributes the load of friction over a number of frictional members, cutting this load in half or less (depending upon the number of packing elements used) and cutting relative speeds in half, or less. Two or more packings are used in connection with the floating and rotatable conduit of this device; and these packings automatically adjust between themselves the frictional loads they will carry. Literally, they divide up the work to be done. This work may be split up between three packings, or four, or more, to the practical limit within which packings may be used with rotatable sections or elements of our floating conduit.

Even when no packing is required in our device, as when there is no need to contain fluids against pressure, as in a circulating or cooling or heating operation, or where fluid pressures are low, our rotatable coupling is rotated by friction, and wear is distributed over the surfaces in friction.

Extreme simplification of the wearable elements of this invention make it possible to manufacture the same with minimum cost. Where and when these simple parts need replacing the expense is slight, labor included.

For instance, in its simplest form the floating rotatable conduit, which is essential to this invention, is a very simple and short tube, having no side holes, splines, teeth, locks, offsets, gears, threads, dogs, shoulders, or any other easily damaged or expensively made extensions or variations. A simple straight-sided short tube is hard to wear out; and it costs little to replace.

Even in the modified forms of this tube, as shown in this specification and in the drawings, the only thing added is a cup on one or both ends of the simple straight tube. Such cup is for receiving and holding the sealing and packing elements. Even this modified form is about as simple a device as can be offered, function considered.

In the form of our device in which no packing is used and no outside frame or housing is required, it is simple. Parts are easily replaced; and they are few.

There are many valued objects attained in this invention. Most objects may be quite readily collected from a reading of this specification and a study of the accompanying drawings. However, several objects are listed next immediately hereinafter, as follows, to-wit:

(a) A primary object of this invention is the lengthening of the life of all members in frictional engagement in a coupling device by employing a rotatable coupling co-operating with a primary rotating member to provide a conduit communicating with a fixed and non-rotating member.

(b) A primary object of this invention is to reduce the rate of wear, for any given time and/or for any given number of revolutions of a revolving conduit, in the frictionally engaged surfaces of such conduit, and in the frictionally engaged surfaces of a tube employed as part of a coupling between such conduit and a fixed hollow member, and in the frictionally engaged surfaces of such means as may be used to seal against the escape of fluid from such conduit, tube and member.

(c) An object of this invention is to provide an inexpensive floating transfer tube to be so employed in a coupling arranged between a primary rotating conduit and a primary non-rotating conduit as to be quickly, easily and readily replaced when worn or damaged, without disassembling the primary members.

(d) An important object of this invention is the distribution and reduction of speed, heat and wear in the frictional areas of couplings disposed between fixed and rotating members, thus extending the usefulness of all parts in friction.

(e) An important object of this invention is the reduction of wear due to friction in coupling devices arranged between rotating and non-rotating members, which are required to form a common conduit for the passage of fluids under pressure.

(f) An important object of this invention is found in the provision of one or more free floating and self-aligning transfer tubes arranged between a hollow rotating member and a hollow fixed member, and in fluid conductive communication with both such members.

(g) It is an object of this invention to provide a floating transfer tube consisting of one or more segments or sections of rotatable conduit, so sealed against fluid leakage as to allow self-selected variations in the relative rotative motion, between the sealing means and such tube or segments, due to inequality of friction between such tube, and/or segments or sections thereof, and the packing or sealing materials employed to prevent the escape of fluid under pressure from the conduit of which the floating tube is a part.

In the drawings:

Fig. I is a sectionalized elevation of a coupling housing a floating conduit which has identical female ends, each carrying packing.

Fig. II is a sectionalized elevation of a coupling carrying a floating conduit of male design, each end of which is carried by a stuffing box.

Fig. III is an enlarged view of a typical stuffing box, as shown in Fig. II.

Fig. IV is a sectionalized elevation of a coupling disclosing a combination of floating conduits, including a female conduit as shown in Fig. I, and a male conduit as shown in Fig. II, forming a common conductor.

Fig. V is a sectionalized elevation of a coupling disclosing a series of floating conduits cooperating to form a common conductor, each such conduit being provided with a male end and a female end, and such ends being arranged for articulation with the ends of adjoining conduits.

Fig. VI is a sectionalized view taken along the line VI—VI of Fig. V.

Fig. VII is a sectionalized view taken along the line VII—VII of Fig. V.

Fig. VIII is a perspective view of a male conduit.

Fig. IX is a partly sectionalized elevation of a modified form of coupling requiring no frame.

Fig. X is a sectionalized view taken along the line X—X of Fig. IX.

Fig. XI is a sectionalized view taken along the line XI—XI of Fig. IX.

In the drawings, the various parts of our invention, shown in several forms, have been indicated by numerals; and like parts have been given like numerals.

The head of a typical coupling unit is shown as at 10. Its hollow interior provides the primary non-rotating or fixed conduit of the coupling. The base of this unit, providing a spindle housing, is shown as at 30. 40 indicates the spindle itself, which constitutes the primary rotating conduit. One of our typical floating conduits is shown as at 50.

The coupling unit as a whole is indicated as at 60, and this unit includes the head 10, the base 30, and the side rails 20, which rails are connected to both head and base, and hold them in spaced relation, while providing a protecting cage about the floating conduit.

The fixed members 10, 20 and 30 collectively constitute the housing or frame 48, which encases and maintains the spindle 40 and the floating conduit 50.

Suitable means for connecting the entire coupling unit to an extension of the non-rotating conduit, or to a fixed pipe or hose, should be provided on the head 10 of the coupling 60. Therefore, this head may be provided with internal threads, as at 11, or external threads (not shown) or with a suitable flange, or with a collar or other means of connection, as may be desired.

As shown in Fig. I, the typical head 10 is provided with an enlarged bore 12, which, in this case, is threaded. The beveled or sloping walls 13, of this large bore lead to the smaller bore 14, the walls of which may be extended to form a fixed nipple 15, or otherwise fashioned so as to provide a projection of annular nature on the lower face 19 of head 10. This projection may be provided with a flange or upset annular beveled lip 16, affording a circular underface 17, made suitable for receiving gasket 65, which will be maintained between this face and a somewhat like but upturned face to be found on the flange or beveled lip 45 of the replaceable wear nipple 44.

Below the lower face 19 of head 10, and surrounding the outer wall of the projection or nipple 15, lies an annular space 18, partially enclosed by the ribs or side rails 20. This space should be ample to allow the use therein of the split collar 47, which is more clearly shown in Fig. VI. This split collar facilitates quick and removable connection between the wearable and replaceable nipple 44 and the fixed nipple 15, the latter being a downwardly extended projection from the head 10.

A somewhat like construction, affording a somewhat like connection, is found in the lower part of the housing, just above the base 30 thereof.

There we find space 21 lying between the upper face 22 of housing base 30 and the side rail members 20, which space surrounds the neck 31, of spindle 40. This space is made sufficient to receive clamping means holding together the spindle and the nipple 42. Neck 31 may be flared or beveled outwardly to form the lip 31a, the upper face of which is finished smoothly, to meet the lower face of lip 43 of expendable wear nipple 42 (which nipple may be an inverted duplicate of wear nipple 44, carried in the upper part of the assembly).

Gasket 65 may be used between these two faces, to seal against the loss of fluid passing through these united members.

Suitable clamping, coupling, connecting or catching means may be employed to affix the wear nipples to the members which carry them. We have disclosed a very effective and simple form of device for making such connection. It is the split collar 47, composed of the two halves 47a and 47b. This split collar may be held together very well and faithfully by the use of bolts 46. Such a split collar is easily attached and detached; and the V-shaped groove therein will fit nicely over the lips 16 and 45, and also over the lips 31a and 43; and when the collar is drawn up tight, through the use of bolts 46, these lips will be brought into close engagement, compressing the packing ring or gasket 65 therebetween.

With the construction indicated, it should be apparent that a complete floating conduit unit 50, carrying expendable wear nipples 42 and 44, properly packed, may be set very quickly into the housing of our coupling 60, fastened in operating position, with little labor and in short time. Likewise, the floating conduit may be removed easily and speedily.

The base 30 of the coupling unit 60 includes the solid web 23, the innermost wall of which may be channeled to receive the grease retaining ring 29, which ring would thus be allowed to encircle the spindle 40 near its upper end. Base 30 may have an inclined wall section 24, leading to the reduced and straight walled section 25 thereof.

At the lower end of the straight walled section 25 of the base 30, there should be provided some means for retaining bearings and lubricants within this section, the better to accommodate the revolving spindle 40. In the drawings such means include internal threads 26, receiving retaining plug 27, the plug being internally channeled and provided with grease retaining ring 28.

Any suitable means may be employed to close the lower end of section 25 of the base 30, whether it be plugs, flanges, bolts, screws, or any other members.

Spindle 40 rotates within the base 30, and is provided therein with suitable bearings, such as roller bearings 35, or ball bearings 36, or any other suitable form of anti-friction device.

The construction indicated in the drawings allows an open space 32 between the web 23 and the plug 27; and in the space may be mounted the bearings 35 and 36.

The upper bearing 35 may be retained between the shoulder 33, provided on the lower face of web 23, or on the inner face of the base wall 24, and a band or shoulder 34 provided on the outer wall of the spindle 40.

The lower bearing, indicated as at 36, may be carried on shoulder 37, arranged in the outer wall of the spindle 40, so that it will lie upon ring 38, of the plug 27; or it may be arranged directly on the plug without the use of the ring. It simply has to be supported. That is all. The bearings may be kept in place through the use of any means found suitable.

The lower end of the spindle 40 should be provided with suitable connection means, such as the threads shown at 39, or with suitable flanges or other connecting devices, so that it may be firmly (but removably) attached to a tube or hollow vessel. This main rotating member or primary rotating conduit 40 may be considered as a hollow drive shaft, and provision may be made to apply power thereto.

More 41 through the spindle is in alignment with bore 58 through the wear nipple 42; and it is also lined up with bore 68 in wear nipple 44, and with the bore 14 of the projection nipple 15; and with these bores the bore 55 of floating conduit 50 will align itself.

It is to be noted that the replaceable wear nipple 42 is a rotatable nipple, whereas the replaceable wear nipple 44 is a fixed and non-rotating nipple. However, each of them receive approximately the same amount of wear, because of the peculiar construction, function and use of the floating conduit 50, which automatically distributes wear to these nipples and their packing.

The floating conduit 50 may be provided with female ends, each carrying packing. The packing may be carried in a cup, arranged on each end of the conduit, such as that shown as a packing bell 51, forming an enlarged mouth at the lower end of conduit 50. The other end of this conduit may be provided with a like packing bell 61. Both bells or cups carry packing or sealing materials.

An externally threaded annular retaining plug 52 may be fitted into the open end of bell 51, the latter being provided with female threads 54, to receive the plug; and the plug itself may be provided with wrench sockets 53, to facilitate its introduction and removal.

Packing 57, of any suitable type or character, may be placed within bell 51, and kept compressed by the use of screw plug 52, so that it will maintain frictional engagement with the outside of replaceable wear nipple 42.

It is to be noted that there is a definite space, shown as at 56, between the bottom of the bell 51 and the end of nipple 42. This space is provided so that these members will not come into frictional engagement with one another, or cause any drag, when the nipple is being rotated within the bell.

The upper end of floating conduit 50 may be made as a duplicate of the lower end, or substantially so. It may be provided with packing cup or bell 61, wherein packing 67 is kept in compressed condition through the use of plug 62, which may be carried within the threads 64, on the inner wall of the end of the bell; and wrench sockets 63 may be provided in the plug 62.

Space 66, complementing like space 56, is normally maintained between the free end of replaceable and non-rotating wear nipple 44 and the shoulder of the cup or bell 61, immediately surrounding it, so as to avoid any unnecessary friction, and further to allow the conduit 50 to ride up and down and "float" longitudinally, while it also "hunts center" around the wear nipples.

The ring gasket 65 may be carried between the faces of the lips 31a and 43; and a like gasket may be carried between the faces of the lips 16 and 45, so that no leaks may occur in the nipples leading in and out of the packing cups carried by conduit 50.

Bore 68 of nipple 44 and bore 58 of nipple 42 are usually of the same diameter as bore 55 of the conduit 50. Packing 57 and packing 67 (which may be of the chevron type, as indicated in the drawing, or any other suitable packing material) will be so carried within the packing cups about these nipples as to assist in maintaining alignment between the several members forming a common conduit through the entire coupling assembly 60, to-wit: the members 15, 44, 50, 42 and 40.

All of the elements and parts heretofore discussed by using numerals to refer to them may be found illustrated in Fig. I of the drawings, which shows a typical floating conduit having both ends female. Such a device well illustrates the essential theory and design employed to create a freely floating conduit which will so operate as to lengthen the life of all frictional surfaces within and/or adjoining and/or engaging it which are subjected to wear because such conduit is required to operate as a rotatable part of a coupling arranged between a fixed conduit and a primary rotating conduit.

The operation of a typical form of our invention may be made more clear by here describing the steps in the assembly of a typical device, such as that shown in Fig. I of the drawings.

Suitable bearings are mounted in the base 30 of the coupling assembly 60, so as to carry thereon the rotatable spindle 40. Grease is packed around the spindle, between the grease retaining rings 28 and 29, and plug 27 is made up tight.

A primary rotating member, for which our invention provides a unique coupling, is shown as at 40 in Fig. I. In other forms it may consist of any rotatable hollow member, such as a pipe, tube, hose, barrel, or shaft, or any other hollow body capable of conducting fluid, and which is required to rotate in the performing of some necessary industrial operation. Types of such operations have been indicated in foregoing parts of this specification. They are quite numerous.

At any rate, the primary rotating member communicates with the rotatable floating conduit. Such primary member may be provided with an extension. See Fig. IV, for example, wherein such member is shown connected to pipe 99, and where the connector is a standard pipe coupling 98.

Spindle 40 has a very long life, because it is mounted on appropriate bearings and properly lubricated and is substantially free from frictional engagement and has very little wear thereon. Except for damage it is rarely removed.

However, the upper part of spindle 40 is provided with easily replaceable and rotatable wear nipple 42, which is carried in packing in the bell arranged on the lower end of floating conduit 50. The nipple 42 is attached to spindle 40 through the use of any suitable means, such as the split collar 47 (already described).

To put nipple 42 in proper place and connect it to spindle 40, one simply inserts the straight end of this nipple into the cup or bell, shown as at 51, and places proper packing material around it such as string packing.

However, pre-cut ring packing of suitable size and amount may be laid around the nipple on ring plug 52, previously slipped over the nipple; and then the packing carrying nipple is inserted into the bell, and the ring plug is made up until the packing is spread enough to hold the nipple in the bell and seal against loss of fluid and pressure.

The next step is to set the packed nipple 44 in place in bell 61 in like fashion. Then, floating conduit 50 (carrying both of its packing-held wear nipples) is slipped into place between side rails 20, lined up with fixed nipple 15 and spindle 40, and clamped firmly in place, split collar 47 being used to bind these members in leak-proof alignment with the wear nipples.

The primary non-rotating conduit extension is made up into head 10 (or arranged as a pipe 89 in collar 82, of Fig. II); and the device is then fully assembled and ready for operation, meaning that the prime rotator, such as member 40, may thereafter rotate freely and for a very, very long time, without requiring any attention to coupling 60 or the replacement of any of its parts.

Whenever the bell packing or the wear nipples are worn appreciably they may be quickly removed and replaced with new units, without even removing the spindle 40, and without disconnecting the primary or stationary conduits.

In fact, it should be seen that the only frictionally wearable surfaces which need give use any concern at all are those of the replaceable nipples and of the packing which surrounds these nipples; and that both the packing and the nipples are immediately and easily replaceable. Thus, extremely long service is afforded by our device.

By removing bolts 46 in both the upper and lower split collars 47, the floating conduit 50, carrying its packing bells with the wear nipples therein, may be easily slipped out of the assembly for inspection, cleaning, repacking, replacement, or for any other purpose.

Replaceable wear nipple 44 is attached to the fixed end of the coupling assembly (being head 10 in Fig. I) by affixing it to extension nipple 15, which is permanent, and non-rotating; and therefore, replaceable nipple 44 does not rotate. It is carried within the packing in the bell in the upper part of the floating conduit 50, so that such packing is rotatable around the nipple.

Extending out from the head of any typical coupling, there may be arranged a pipe or tube or hose, or other suitable conductor, such as member 89, for receiving or discharging materials passing through the coupling. Any coupling may be anchored, suspended or supported in any desired fashion and by any proper means.

Power may be applied directly to the spindle or to some extension thereof, as to tube 99. Whenever desired the primary rotating member 40 is rotated, together with its replaceable nipple 42. If the packing surrounding this nipple is somewhat tight, then the floating conduit 50 will itself revolve with the rotating spindle 40, either at the same speed or at less speed. In such case, packing 67 will rotate around the fixed nipple 44, in the upper part of the assembly, until such packing swells, because of friction and the heat thereof; and the nipple itself may expand due to heat. This swelling and expansion will continue until there is closer engagement between nipple 44 and its packing 67; and the friction becomes greater.

Whenever this happens, the floating conduit 50 will rotate less freely; and it may even cease to rotate at all, for a period of time (which is usually a relatively short time). During this period of time, the nipple 42 rotates within bell 51; and it rotates more rapidly within its packing 57, in the lower bell, as the frictional engagement between nipple 44 and its packing 67 increases.

Depending upon the relative extent of frictional engagement between the upper packing and its fixed nipple, and frictional engagement between the lower packing and its rotating nipple, the floating and rotatable conduit 50 will rotate with greater or less speed, or cease to rotate.

Floating conduit 50 will vary the speed of its rotation in response to the relative amount of frictional engagement at each end thereof. As a practical matter, this relative speed of rotation is quite variable. It is very sensitively responsive to friction. Member 50 starts, speeds up, slows down, stops; and then it starts and completes the cycle all over again.

The floating conduit distributes wear on the packing in each of its bell shaped ends fairly and with uniformity. It substantially evens up the wear on the replaceable nipples 42 and 44.

Over any substantial period of time, the average relative speed of rotation between the floating conduit 50 and fixed wear nipple 44 will be about half the speed of rotation of the spindle 40. To put it another way, over any extended period of operation, the floating conduit 50 operates at an average of about half the speed of the spindle 40. Sometimes it is running along at the same speed as the spindle; and at other times it is not rotating at all.

Wear is distributed to both of the replaceable nipples 42 and 44; and wear is distributed between the packings 57 and 67; and such wear is so distributed very uniformly.

Experience has taught that our coupling, with dual packing and a single floating conduit therein, will operate at least twice as long as any conventional coupling (which employs only one rotating unit and one fixed unit), without attention, shut-down, inspection, or need for repairs. Heat, friction, wear, lost time and lost labor are all greatly reduced; and the life of equipment employing our invention is greatly extended.

In fact, the extended period of carefree operation of our floating conduit coupling is substantially in direct ratio to the number of floating conduit elements we provide in any coupling unit.

In Fig. I we show a single floating conduit element with dual packing. In Fig. II we show another form of single floating conduit with dual packing. In Fig. IV we show dual floating conduit elements with triple packing. In Fig. V we show multiple elements and multiple packings; and the number of each may be increased as the needs of the job may require. The possible combinations are numerous and flexible. They are determined by size, space, speed, fluid pressure and other physical variables of the job required to be done.

Figs. IX, X and XI show a form of our coupling which may be constructed without a frame and operated without packing. Yet the floating conduit therein is moved by friction and distributes wear between friction surfaces.

Referring now to modified forms in the design and construction of one of our couplings, attention is called to the slightly modified spindle 70, disclosed in Fig. II, which may be provided with male threads 71, and a lower shoulder 72 to contain bearing 36, and another shoulder 73 to contain any suitable bearing, such as another bearing 36. It is to be noted that, in this instance, no band supports the last named bearing, and that between the two bearings indicated there is a straight side wall on spindle 70.

Spindle neck extension 74 may be provided with beveled lip 75; and the bore 76 provides a passage through this modified spindle.

A modified and shortened casing will house the short coupling shown in Fig. II; and this casing may be made up of head 81, side rails 86, and spindle housing 87, such housing being provided with transverse web 88 to afford an upper closure.

The entire assembly of this shortened coupling is indicated as at 80. The head portion 81 thereof may be provided with a threaded collar 82 to receive anchoring and extension member 89, which is here shown as a tube leading into coupling 80.

An annular and downwardly disposed projection below the face of head 81, is shown as at 83, being an extension of the conduit shown through the head as at 85. The projection 83 may be provided with a beveled lip 84 to connect with a like lip 59a on the neck of stuffing box 77, with gasket 65 between the lips, so that the box may be removably attached to the head 81, to become a fixed and non-rotating stuffing box, carrying packing 67 therein, which is kept in place and compressed through the use of threaded annular ring 62, provided with wrench sockets 63.

In the modified form of device shown in Fig. II, a stuffing box 78 may be made as an inverted duplicate of stuffing box 77 therein, including the extension neck 69 provided with a beveled lip or flange. Stuffing box 78 is attached to rotating spindle 70, so that it will rotate therewith.

The short necked stuffing boxes 77 and 78 may be united to the members which carry them by the use of split collars 47 and bolts 46, or through the use of any other suitable connecting means.

A free floating conduit 79, of male design, carried in stuffing boxes 77 and 78, will then be disposed between extensions 83 of the fixed head 81, and the rotating spindle 70, the latter providing a primary rotating conduit.

Attention is called to the fact that the floating conduit 79 is, in this modified form, nothing more or less than a perfectly straight sided short tube. The cost of making such a member is reduced drastically to a mere minimum. Nevertheless, conduit 79, will distribute wear between its two ends, and between the packing 67 and the packing 57, in the stuffing boxes carrying the conduit.

The ease and simplicity and speed with which conduit 79 may be removed, examined, replaced or repacking is self-evident. The clamps or split collars 47 are opened quickly, and the stuffing boxes 77 and 78 are removed with the member 79.

In the modified form of coupling shown in Fig. II, it is to be observed that the male conduit 79 constitutes not only the floating member, so necessary in our invention, but in itself furnishes the "wear nipples," heretofore indicated as removable parts of the design shown in Fig. I. The male floating conduit 79, together with its stuffing boxes, will perform as effectively as the female conduit 50 and its stuffing boxes; and the cost of making member 79 is considerably less than that of member 50. Costs of producing the coupling is further reduced, below the costs of producing the coupling shown in Fig. I, by eliminating wear nipples 42 and 44, simplifying the spindle and shortening the housing, so as to make the shorter coupling an improvement over the longer one.

A further modification of our invention is shown in Fig. IV, wherein a free floating female conduit 50 is employed along with a free floating male conduit 79. One end of the male conduit is carried in stuffing box 61, which is a part of the female conduit.

The threaded bore 94, of the head of the modified casing employed in coupling assembly 90, is continued to form a well 91, in which is placed packing 92, the latter being held in place by modified plug ring or gland 93, which is so constructed as to limit the longitudinal movement of floating conduit 79, by providing a shoulder thereover.

The lower packing bell on conduit 50, shown in Fig. IV, may be made to receive packing 57, compressible with a suitable ring plug 52. This packing will engage an extension 97 on modified spindle 95. Such an extension of the spindle becomes quite practical because of the reduced wear thereon.

Note that we are here using two floating conduits, one male and one female, together with three sets of packing, so arranged as to have one set on each end of each floating conduit.

The wear on the packed end of special spindle 95 is approximately one-third of the total wear occasioned by rotating members in this assembly.

Housing 96 around spindle 95 is provided with bearings as required, packed with grease, and plugged, with the free end of the spindle extending therefrom.

Any suitable extension, such as that shown as pipe 99, may be attached to any spindle in any assembly presented by this invention; and in Fig. IV such member is shown removably connected to spindle 95.

Flanges, collars, couplings or other means may be used for making connection between any primary rotating member and any extension thereof or any source of power.

Generally speaking, whenever the terms "stuffing box" or "packing," or the like, are used, in this specification, it must be understood that such may have substituted therefor metal bearing surfaces, or other means for providing seats and/or seals, including Babbitt metal and dissimilar metals, and rubber and plastic compositions.

We have shown a further modification of our invention in Fig. V, wherein special couplings 100 is provided with head 101, and side rails 102, the latter connecting with the casing 103 which houses spindle 40 and its bearings, below a transverse web 104.

A specially modified form of free floating conduit is indicated as at 105, which conduit consists of a stuffing box 107 and a straight sided nipple 106 extending therefrom, and adapted for rotation within a like packing housing on a like free floating member.

The male end of the combination conduit 105 is shown as at 106, and the female end thereof as at 107; and the bore 108 therethrough should be substantially the same as that of fixed wear nipple 44, the bore of which is shown as at 68.

In the modified form latest discussed, indicated in Fig. V, it will be seen that one wear nipple is non-rotatably attached to the head of the frame of the coupling; and a plurality of floating conduits, each having a male and a female end, are placed therebelow, to afford a continuous passage through the head and through these floating members carried in the frame, so as to communicate with the rotating spindle and extensions of the primary rotating member connected thereto, the latter being arranged below the coupling unit.

Through the use of modification, such as indicated in Fig. V, there may be arranged and operated variously made couplings of our general design and invention incorporating therein as many free floating conduit members as may be desired, the better to further distribute wear and to further extend the life of members subjected to wear. There is no limit to the number of free and rotatable conduits which may be made up into any desired arrangement of multiple floating members to form a coupling, other than the practical considerations arising from the nature and character of the work to be done, space limits, strength, speed, pressure and other physical factors which may condition the required operation.

We have disclosed suitable forms for practicing the invention of a coupling to be arranged between a primary non-rotating conduit and a primary rotating conduit, which coupling incorporates therein one or more of several free floating members, the ends of which are packed about, so as to seal against the pressure of fluids passing through the coupling, from one primary member to the other; and our invention affords a long-lived device, capable of use over a very extended period without the loss of time, labor and materials, due to frequent shutdowns, such as have characterized the use of couplings of orthodox nature in the past.

In the modified form of our invention disclosed in Figs. IX, X and XI, packing and its substitutes are not necessary.

Here we employ a primary fixed hollow head 110, which is the stationary conduit of our coupling assembly. It may be provided with any suitable means for affixing it to a supporting member with which it communicates, and from which it receives fluid or to which it delivers fluid. Threads 111 indicate one type of connecting means.

Passageway 112 is provided through member 110. The end walls of this member may be upset, or otherwise fashioned to form friction ring 113. This ring may be made integral with the side walls of head 110, or it may be added thereto, as by welding, or otherwise, as with pins. The lowermost end of the passageway through member 110 may have a beveled side wall, as at 114, if desired.

A cross sectional elevation of member 110 may have the appearance of an inverted hollow T. Of course, it may have any other suitable shape as desired.

Primary rotating member 120 may take the form of a hollow shaft or spindle, or it may take any other suitable form. It has been shown in the drawing as an inverted duplicate of member 110; but such likeness is by no means necessary.

Spindle 120 may be provided with an upset head 123 to form a friction ring; or such ring may be made in any fashion appropriate. Friction ring 123 will be provided with friction shoulder 126.

A passageway as at 122, is provided through spindle 120; and at its uppermost end such passage may be flared outwardly to form bevel 124.

Spindle 120 may be provided with threads 121, or with any other suitable means for attachment to any extension of this assembly, or to any auxiliary mechanism required to operate with the spindle.

Rotatable conduit 130 is suspended between stationary conduit 110 and rotating conduit 120. Conduit 130 may take any one of several forms. It should be suitably constructed for easy mounting and removing, the better to facilitate the attachment of this member to the conduits 110 and 120. A convenient and inexpensive form of conduit 130 is shown in cross section in Fig. X. The floating conduit thus disclosed has been divided into two vertically disposed halves, 130a and 130b. Each half is provided with a web or flange, shown as at 131a and 131b.

A plurality of bolt holes 132 should be made through the immediately adjacent faces of webs 131a and 131b, to receive bolts 133; secured and held in place by nuts 134.

Passageway 135 is provided through rotatable coupling 130. It is recommended that passageways 112, 122, and 135, be of substantially the same diameter.

Friction collar 136 is provided on the upper end of rotatable conduit 130. It affords a friction chamber defined by complementary walls 136a and 136b. The upper part of such collar is returned inwardly to form friction lip 137, which will hang over and be supported by friction shoulder 116 on friction ring 113 of stationary conduit 110. There should be arranged a space or clearance 115 around ring 113 and within collar 136.

The lower end of rotatable conduit 130 may be made in like fashion. When so constructed it will afford a friction collar as at 140, and friction lip as at 139. This lip will underhang friction ring 123, so that the friction shoulder 126 thereof will come to rest upon and be supported by lip 139.

Such construction will result in a very rugged rotatable coupling 130, but one which is easily dismantled and easily replaced. With the construction indicated, it will be seen that rotatable hollow shaft 120 will revolve in friction collar 140 and be supported thereby. The faces or surfaces in frictional engagement will be the underface of friction ring 123 (indicated as the shoulder 126) and the upperface of the lip 139. Eventually these two surfaces in frictional contact will wear together to effect a very satisfactory seal against fluids, liquids or other materials which are under little or no pressure.

A ring of Babbitt metal may be inlaid in each of the opposed faces, if desired. The opposed faces may be made of dissimilar metals, if desired. Packing, of any suitable kind, may be placed in space 125, if desired, though it is not necessary in this form of our device.

When assembled as indicated in the foregoing, the modified form of the device shown in Fig. IX will be suspended from such member (not shown) as the stationary conduit 110 may be attached to; and rotatable conduit 130 will hang on the member 110; and the two faces represented by the under side of lip 137 and the upper side of ring 113 will be in frictional engagement, effecting a seal against relatively low pressures.

Whenever the spindle 120 is rotated, it will rotate the rotatable conduit 130, especially if there is some weight on the member 120, or if the co-efficient of friction between the members 120 and 130 is or becomes relatively high. The rotatable conduit 130 will turn about the member 110, to some extent, depending on the amount of friction therebetween.

Wear is therefore distributed between the friction lips 137 and 139; and likewise wear is distributed between the friction rings 123 and 113, insuring a lengthened life to the several members shown to be in contact when rotation is effected in the primary rotating member 120.

The frameless, packing-less, rotatable conduit coupling is of great utility and its parts have a long life, even though its primary rotating member is required to operate at relatively high speed.

In any form of our device frictional drag is automatically shifted from one area subject to friction to another such area, so as to more evenly distribute and make more uniform the wear occasioned by relative rotative motion.

We claim:

1. A hydraulic rotary swivel, comprising: non-rotatable and rotatable fluid conducting elements; a floating tube for conducting fluid and interposed between said elements and separable therefrom and demountable packing-assemblies around the ends of the tube, respectively; each assembly including sealing means around the tube and a member provided with means for detachably attaching the assembly of which it is a part, to one of said elements, the sealing means of each assembly having contact with the tube which leaves it free to rotate or remain stationary during operation of the swivel, said members being movable toward each other on the tube when they are uncoupled from said element.

2. A hydraulic rotary swivel comprising: non-rotatable and rotatable fluid conducting elements; a tube for conducting fluid and interposed between said elements and separable therefrom; and packing-assemblies adjacent the ends of the tube, respectively, each assembly including annular packing means contacting the tube and a member provided with means for demountably attaching the assembly of which it is a part, to one of said elements, said members being movable toward each other longitudinally of the tube to clear the elements for unitary removal of the tube and the assemblies laterally from the elements, said tube and packing-assemblies being endwise reversible for connection to either of said elements.

3. A coupling device comprising: non-rotatable and rotatable fluid-conducting elements, a floating conduit for conducting fluid interposed between said elements; packing elements arranged between the respective ends of the conduit and the said element and carried by the latter, the packing elements being in slideable contact with the conduit, thereby leaving the conduit free to rotate or remain stationary with respect to the packing elements during the rotation of the rotatable fluid-conducting element.

4. In a coupling, a fixed conduit; a rotatable conduit; means for spacing apart the fixed and rotatable conduits; a floating conduit interposed between the fixed and rotatable conduits; packing elements arranged between the ends of the floating conduit and the fixed and rotatable conduits respectively; the said packing elements being in slideable contact with the floating conduit, and the said floating conduit being free to rotate or remain stationary with respect to either of the packing elements upon the rotation of the rotatable conduit.

5. In a coupling, a fixed conduit; a rotatable conduit; a housing arranged between the fixed and rotatable conduits and so attached thereto as to hold them in spaced relation; a floating conduit arranged between the fixed and rotatable conduits; packing means arranged between the fixed and rotatable conduits and the ends of the floating conduit, said packing means frictionally engaging the floating conduit, and the said floating conduit being free to rotate or remain stationary with respect to each of the packing means.

References Cited in the file of this patent

UNITED STATES PATENTS

| Number | Name | Date |
|---|---|---|
| 2,379,035 | Phillips | June 26, 1945 |
| 2,412,287 | Phillips | Dec. 10, 1946 |
| 2,459,472 | Tremolada | Jan. 18, 1949 |
| 2,558,990 | Stahl et al. | July 3, 1951 |